United States Patent [19]

Miller

[11] Patent Number: 5,155,366

[45] Date of Patent: Oct. 13, 1992

[54] METHOD AND APPARATUS FOR DETECTING AND DISCRIMINATING BETWEEN PARTICLES AND RAYS

[75] Inventor: Thomas G. Miller, Madison, Ala.

[73] Assignee: General Research Corporation, Vienna, Va.

[21] Appl. No.: 753,368

[22] Filed: Aug. 30, 1991

[51] Int. Cl.$^5$ ............................ G01N 1/20; G01N 3/06
[52] U.S. Cl. ..................... 250/368; 250/366; 250/367; 250/390.07; 250/390.08; 250/390.11
[58] Field of Search .............. 250/390.11, 390.04, 250/390.07, 366, 367, 368, 390.08; 376/153, 158

[56] References Cited

U.S. PATENT DOCUMENTS 4,180,736 12/1979 Goodman ..................... 250/390.08
4,829,185 5/1989 Cerff ........................... 250/390.11

OTHER PUBLICATIONS

Thomas G. Miller, Welman Gebhart, Lee Hilbert, and George Edlin, "Fiber Optics Neutron Detectors", Worshop on Scintillating Fiber Detector Development for the SSC, Nov. 14–16, 1988.
P. Sperr, H. Spieler and M. R. Maier, "A Simple Pulse Shape Discrimination Circuit", Nuc. Instr. and Meth., 116 (1974), pp. 55–59.
Miller, Thomas G., "Measurement of Pulse Shape Discrimination Parameters for Several Scintillators", Nuc. Instr and Meth., 63 (1968), pp. 121–122.

Primary Examiner—Carolyn E. Fields
Attorney, Agent, or Firm—Nixon & Vanderhye

[57] ABSTRACT

Apparatus and method for detecting a particular type of particle in an energy range of interest are provided. The apparatus includes two photomultipliers (24, 26) which are spaced apart in facing relation to one another. A scintillator (22) is positioned between the photomultipliers (24, 26). The scintillator (22) comprises an array of optical fibers, preferably light pipes (40), arranged substantially contiguously side-by-side. Each of the light pipes (40) has a first end proximate the first photomultiplier (24) and an opposing second end proximate the second photomultiplier (26). Each light pipe (40) has one of its ends being non-transmissive of light. The light pipes are arranged so that contiguous ones of the light pipes (40) do not have their same ends being non-transmissive of light. Each of the light pipes (40) in the array have a cross sectional dimension thereof chosen in relation to a distance that the particular type of particle in the energy range of interest can travel. A signal processor unit (28) uses signals from the photomultipliers (24, 26) to determine when a particular type of particle in the energy range of interest is detected. The signal processor unit (28) discriminates between different types of particles and rays by determining the number of light pipes (40) affected within a predetermined time interval by an incoming particle or ray.

11 Claims, 4 Drawing Sheets

METHOD AND APPARATUS FOR DETECTING AND DISCRIMINATING BETWEEN PARTICLES AND RAYS

BACKGROUND

1. Field of Invention

This invention pertains to method and apparatus for detecting particles, particularly to method and apparatus for detecting particles (such as neutrons) in a manner to discriminate between the particles and background radiation (such as gamma rays).

2. Prior Art and Other Considerations

It is well known that, in general, neutron counters not only respond to neutrons but to gamma rays as well. These gamma rays can be considered as background counts and hence, contribute to the experimental uncertainty of the parameter that is being measured, assuming the parameter being measured depends on the number of neutrons that are counted. Hence, it is important to develop techniques to differentiate the neutron counts from the background gamma ray counts.

Neutron-gamma ray discrimination has been accomplished in the past by pulse shape discrimination. See, for example, P. Sperr, H. Spieler and M. R. Maier, "A Simple Pulse Shape Discrimination Circuit", *Nuc. Instr. and Meth.*, 116 (1974), pp. 55–59. This technique is made possible due to the fact that the pulse shapes of certain scintillators depend on the exciting particle. For instance, the organic scintillator, stilbene, gives a different pulse shape out when excited by neutrons than when excited by gamma rays. This is due to the fact that the scintillator is excited by recoil protons when excited by neutrons and is excited by Compton generated electrons when excited by gamma rays. Other scintillators that exhibit pulse shape scintillation are anthracene and certain liquid scintillators. See Miller, Thomas G., "Measurement of Pulse Shape Discrimination Parameters for Several Scintillators", *Nuc. Instr and Meth.*, 63 (1968), pp. 121–122.

Present day neutron-gamma ray discrimination circuits are limited in their usefulness due to their count rate limitation. The maximum count rate for neutron-gamma ray separation using present techniques is limited due to pulse pile-up in the scintillator itself, due to the long component of the neutron pulse; and, due to the problem of pulse processing in the electronics. Progress has been made in recent years in building neutron-gamma ray discrimination circuits that achieve higher count rates, but it appears that about 50,000 counts per second may be an upper limit if good resolution is to be achieved.

Another problem with present day neutron-gamma ray discrimination circuits is that they achieve good separation only in a limited neutron energy range which is about 1 MeV to perhaps 14 Mev.

A fiber optics neutron detector was proposed by Thomas G. Miller, Welman Gebhart, Lee Hilbert, and George Edlin (see "Fiber Optics Neutron Detectors", presented at the Workshop on Scintillating Fiber Detector Development for the SSC, Nov. 14–16, 1988). According to this proposal, an optical fiber bundle is aimed at a neutron source so that the neutrons are incident on the end of the fibers (e.g., along the axis of the fibers). An opposite end of the optical fiber bundle (e.g., the non-incident end) is flush against an intensifier, which in turn is positioned against a detector. The optical fibers have square cross section and measure 300 microns by 300 microns. The number of fibers traversed by a neutron is used as an indication of the directionality of an incoming neutron beam.

The optical fiber neutron detector discussed in the preceding paragraph requires a specialized detector, such as a charge coupled device (CCD). Moreover, data reduction of the CCD signals is rather formidable, requiring expensive and sophisticated electronics and software.

It is well known that background gamma rays interact with scintillating material to produce Compton electrons. As the Compton electrons travel through scintillating material, the electrons slow down and lose energy via ionization processes which cause emission of photons (e.g., light pulses). The distance a Compton electron can travel in the scintillating material is a function of the electron energy. As shown in FIG. 1, the range of typical electrons produced by the background gamma rays in the scintillating material will be several thousand microns.

When neutrons interact with scintillating material, on the other hand, recoil protons are created. As the recoil protons travel through the scintillating material, the recoil protons also slow down and lose energy via ionization processes which result in the emission of photons. As shown in FIG. 2, the range of typical recoil protons produced by neutrons will have ranges in the scintillating material which are considerably less than the distance ranges of electrons. For example, recoil protons in the range of from 0.5 MeV to 3.0 MeV can travel a maximum distance of about 100 microns.

In view of the foregoing concerns regarding the prior art, it is an object of the present invention to provide neutron/gamma ray discrimination apparatus and method having high count rate and good resolution.

SUMMARY

Apparatus and method for detecting a particular type of particle in an energy range of interest are provided. The apparatus includes two photomultipliers which are spaced apart in facing relation to one another. A scintillator is positioned between the photomultipliers. The scintillator comprises an array of optical fibers, preferably light pipes, arranged substantially contiguously side-by-side. Each of the light pipes has a first end proximate the first photomultiplier and an opposing second end proximate the second photomultiplier. Each light pipe has one of its ends being non-transmissive of light. The light pipes are arranged so that contiguous ones of the light pipes do not have their same ends being non-transmissive of light. Each of the light pipes in the array have a cross sectional dimension thereof chosen in relation to a distance that the particular type of particle in the energy range of interest can travel. A signal processor unit uses signals from the photomultipliers to determine when a particular type of particle in the energy range of interest is detected. In this respect, the signal processor unit discriminates between different types of particles and rays of differing energies by determining the number of light pipes affected within a predetermined time interval by an incoming particle or ray.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

Figure 3:
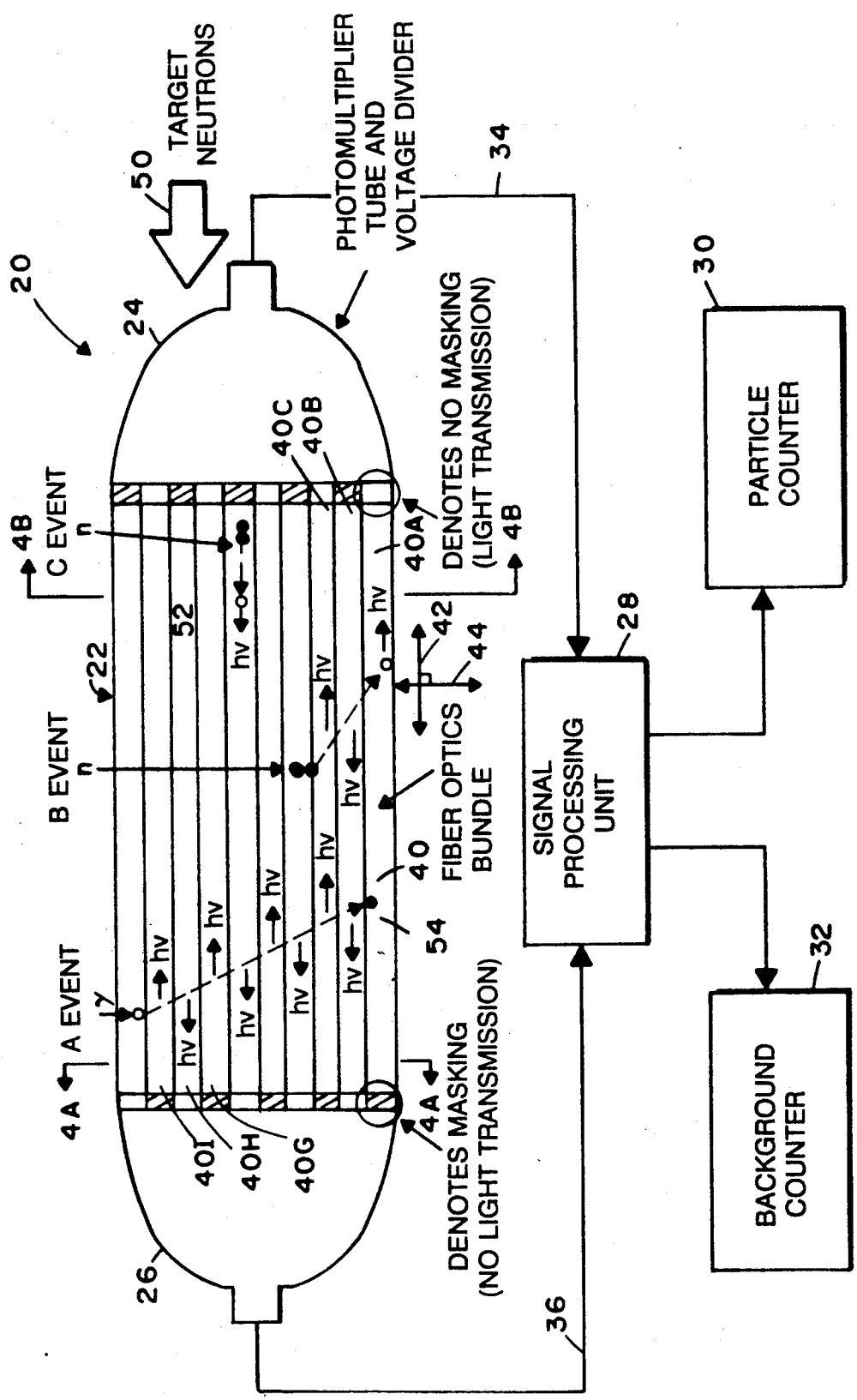
FIG. 3 is partially schematic side view of an apparatus for detecting and discriminating between particles and rays according to a first embodiment of the invention.

FIG. 3 shows a particle/ray detection and discrimination system 20 for detecting a particular type of particle (such as a neutron) in an energy range of interest (such as 0.5 MeV to 3.0 MeV). The system 20 includes a scintillator 22; a right photomultiplier tube 24; a left photomultiplier tube 26; a photomultiplier signal processor unit 28; a particle counter 30; and, a background counter 32.

The photomultiplier tubes 24 and 26 are conventional photomultiplier tubes of the type which produce an electrical signal when a light pulse is incident thereon. In this respect, tube 24 is connected by signal line 34 to the signal processor unit 28; tube 26 is connected by signal line 36 to the signal processor unit 28. Each photomultiplier 24, 26 has its own voltage divider network.

The scintillator 22 comprises an array of optical fibers. As used herein, the term optical fiber preferably includes a light pipe 40 as illustrated in FIG. 3. Each light pipe 40 is formed from an organic (e.g., hydrocarbon) scintillating material, such as NE 102, Pilot B, or BCF-10, which prompts ionization of charged particles travelling through the light pipe 40. In an embodiment wherein the light pipes 40 are constructed from deuterated fibers, the scintillator 22 has enhanced energy measuring capabilities as well as enhanced directional detection capabilities.

Figure 4B:
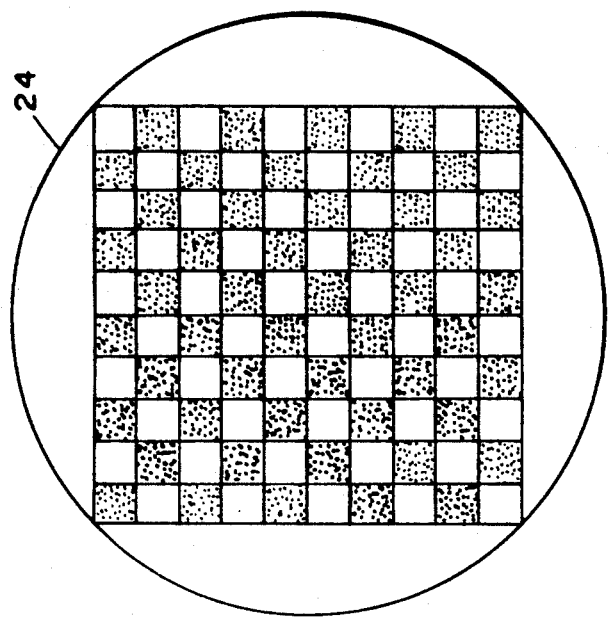
FIG. 4B is a sectional view of the apparatus of FIG. 3 taken along line 4B—4B.
Figure 6:
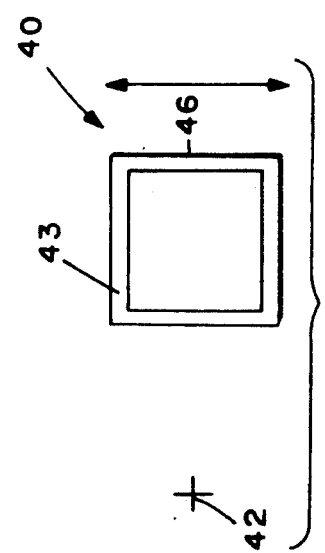
FIG. 6 is a sectional view of a light pipe utilized in the apparatus of the embodiment of FIG. 1.
Figure 4A:
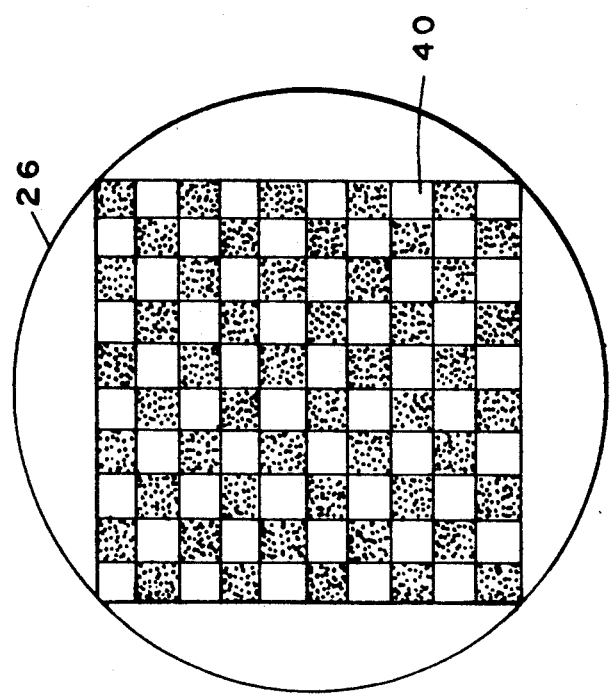
FIG. 4A is a sectional view of the apparatus of FIG. 3 taken along line 4A—4A.

Each light pipe 40 has a length dimension shown by arrow 42 in FIG. 3. Each light pipe 40 measures about one to two centimeters along the length dimension depicted by arrow 42. As shown in FIG. 6, as well as FIGS. 4A and 4B, each light pipe 40 has essentially square cross section. Each light pipe is clad in conventional manner along its length dimension by a cladding 43 having a density which is less than the density of the scintillating material of the light pipe 40. The light pipes 40 are arranged substantially contiguously (e.g., side-by-side) along at least a direction indicated by arrow 44. As seen in FIG. 3, the direction of arrow 44 is essentially perpendicular to a length dimension of the light pipes 40 (e.g., the direction indicated by arrow 42). The light pipes 40 extend for a length of about two inches along the direction of arrow 44. As shown in FIG. 4A and 4B, the light pipes 40 are also arranged contiguously in two dimensions. The extent of light pipes 40 along the directions of arrow 42, 44 may vary in differing embodiments.

Each of the light pipes 40 have a first end proximate the right photomultiplier tube 24 and an opposing second end proximate the left photomultiplier tube 26. As shown in FIGS. 4A and 4B, one end of each light pipe 40 is non-transmissive of light. The non-transmissibility of an end of a light pipe is shown by dark shading in FIGS. 3, 4A, and 4B. The non-transmissive end of a light pipe 40 is masked or coated with an opaque substance, such as aluminum, for example. Peripheral portions of the photomultipliers 24, 26 are also shielded so as not to receive external light.

As shown in FIG. 3, contiguous ones of the light pipes 40 along the direction of arrow 44 do not have their same ends being non-transmissive of light. That is, along the direction of arrow 44, light pipe 40A has an opaque second end (proximate photomultiplier tube 26); light pipe 40B has an opaque first end (proximate photomultiplier tube 24); light pipe 40C has an opaque second end (proximate photomultiplier tube 26); and so forth. Moreover, as shown in FIGS. 4A and 4B, the light pipes 40 are so arranged that ends of contiguous light pipes form an essentially checkerboard pattern of transmissibility and opaqueness.

Each of the light pipes 40 in the array of scintillator 20 has a cross sectional dimension thereof chosen in relation to (e.g., as a function of) a distance that the particular type of particle in a monitored energy range of interest can travel. In particular, as shown in FIG. 6, each light pipe 40 has an edge 46 thereof which extends a distance D. The distance D is chosen in relation to the distance that a particular type of particle in the energy range of interest can travel. For example, in the embodiment under discussion, the distance D is chosen to be 100 microns, which is substantially the maximum distance that a proton produced by a scattered neutron in the energy range of from about 0.5 MeV to about 3.0 MeV can travel (see FIG. 2).

Figure 1:
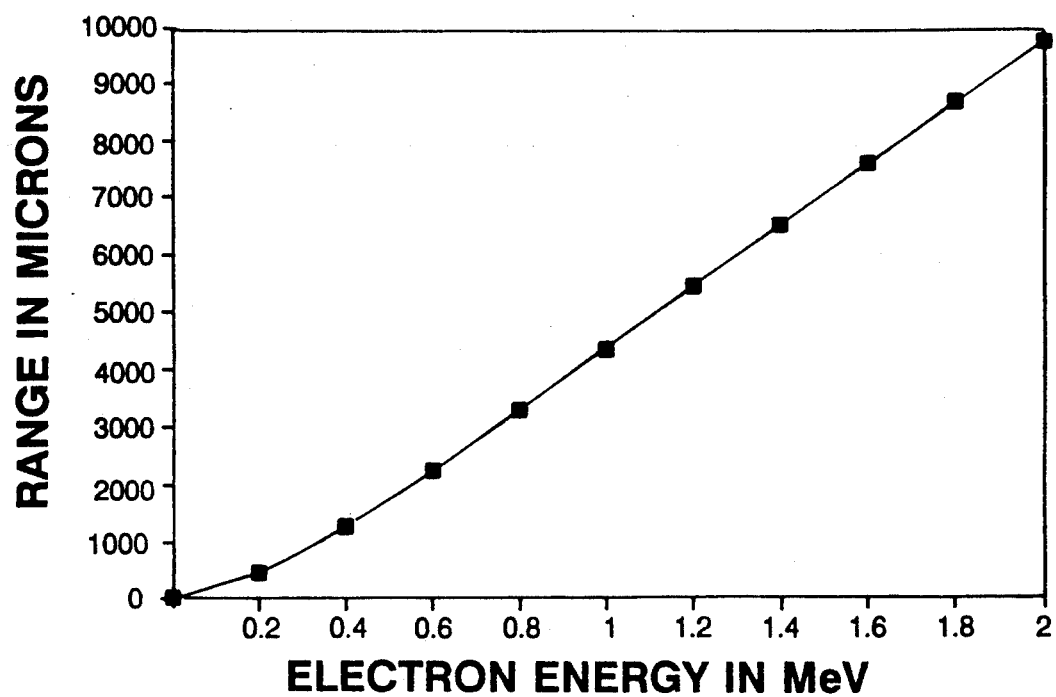
FIG. 1 is a graphical view showing electron range as a function of electron energy.
Figure 2:
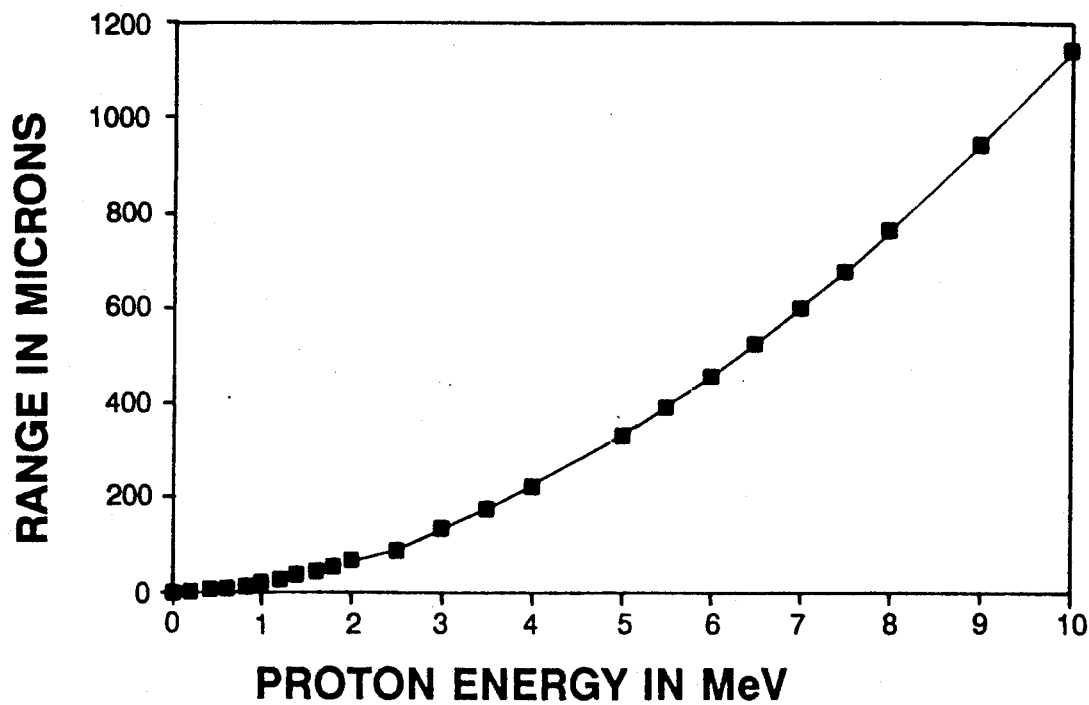
FIG. 2 is a graphical view showing proton range as a function of proton energy.

In operation, the system 20 of FIG. 3 is preferably oriented so that neutrons in the range of interest, for example 0.5 MeV to about 3.0 MeV, are incident along the direction shown by arrow 50. The detection of a neutron in the energy range of interest is shown by the "C Event" of FIG. 3. As the neutron scatters in the scintillator 22, a recoil proton 52 is created. As shown by the graph of FIG. 2, a proton 52 in the energy range of interest cannot travel beyond the particular light pipe 40 in which it was created. In this respect, recall that the light pipes 40 are each 100 microns square, and the photon 52 can travel no more than 100 microns. The recoil proton 52 interacts with the light pipe 40, and the resulting ionization creates a photon (represented by "hv" in FIG. 3) which travels only in the light pipe in which it was created.

A small fraction of the incident neutrons can scatter near the edge of a fiber and create light in two fibers, but these neutrons are few and number and do not significantly affect the system 20.

The photon of Event C is detected by the photomultiplier (26) which abuts the light transmissive end of the light pipe 40 in which the photon was created. Upon detecting the photon, the photomultiplier 26 applies a pulse on line 36 to the photomultiplier signal processor unit 28. The signal processor unit 28 determines that the pulse represents the detection of a neutron in the energy range of interest if a pulse is not received from the other photomultiplier within a predetermined time interval. In the scenario of Event C, such a subsequent pulse is not received within the predetermined time interval, whereupon the signal processor unit 28 applies a signal to increment the particle counter 30.

The detection of a background gamma ray by the system 20 is shown by the "A Event" of FIG. 3. As the gamma ray scatters according to the Compton Effect in the scintillator 22, an electron 54 is created. Electron 54 travels across a plurality of light pipes 40 in the direction of arrow 44, and is shown in FIG. 3 as travelling through about nine such light pipes 40. As the electron 54 interacts with each light pipe 40 in its path of travel, ionization occurs in the scintillating material comprising the light pipes 40, causing the electron 50 to lose energy and emit photons (represented by "hv" in FIG. 3). Photons in a particular light pipe 40 travel through the light pipe 40, but are only transmitted to one of the photomultipliers 24, 26. In particular, the photons in a particular light pipe 40 are transmitted only to the photomultiplier abutting the end of the light pipe 40 which is not masked.

As shown in FIG. 3, the photons in light pipe 40I created by electron 54 are detected only by photomultiplier 24; the photons in light pipe 40H (next contiguous pipe 40I) are detected only by photomultiplier 26; the photons in light pipe 40G (next contiguous pipe 40H) are detected only by photomultiplier 24; and so forth.

When each photomultiplier 24, 26 sees a photon from any of the transparent light pipe ends abutting the photomultiplier, the photomultiplier (24 or 26) applies an electrical pulse to the photomultiplier signal processor unit 28. Upon reception of a pulse from a first of the photomultipliers, the photomultiplier signal processor unit 28 determines whether a pulse is subsequently received from the second photomultiplier (either 24 or 26) within the predetermined time interval. If a pulse is received from the second photomultiplier within the predetermined time interval, the unit 28 realizes that it was not a neutron in the energy range of interest that was detected. The unit 28 then waits to see if a further signal is received from the first photomultiplier within the predetermined time interval after receipt of the pulse from the second photomultiplier, and so forth as long as the photomultipliers send pulses to the unit 28 indicative of the electron. When the predetermined time interval elapses from the receipt of a last photomultiplier pulse, the signal processor unit 28 resets itself, and applies a signal to increment the background counter 32.

The detection of a neutron having an energy in excess of the energy range of interest (for example, a 10 MeV neutron) is shown by the "B Event" of FIG. 3. As the neutron scatters in the scintillator 22, a recoil proton 56 is created. As shown by the graph of FIG. 2, a proton 56 having 5 MeV to 10 MeV, like an electron produced by a gamma ray, can travel beyond the particular light pipe 40 in which it was created. The recoil proton 56 interacts with a plurality of light pipes 40, thereby emitting photons (represented by "hv" in FIG. 3) which travel in their respective light pipes much in the manner of the photons created by the electron of Event A. Photons are thus incident upon both of the photomultipliers 24, 26 within the predetermined time interval, with the result that the photomultiplier signal processor unit 28 determines that the signals from the photomultipliers do not represent neutrons in the energy range of interest. Accordingly, unit 28 applies a signal to increment the background counter 32.

The predetermined time interval of the photomultiplier signal processor unit 28 is on the order of about 5 nanoseconds. Thus the predetermined time interval is sufficiently short that a second pulse applied to the unit 28 from a photomultiplier 24, 26 within the predetermined time interval from a first pulse must correspond to the same particle or ray that caused the first pulse.

The determination by unit 28 of whether a photon is indicative of a particle in the energy range of interest is thus based on the sequence and timing of output signals from the photomultipliers 24, 26.

Thus, the present invention determines the number of optical fibers in the scintillating medium in which photons are created. As used herein, the expression "determining the number of optical fibers in the scintillating medium in which photons are created" encompasses determining whether photons affect one fiber or more than one fiber during a predetermined time interval.

The detection and discrimination system 20 of the present invention thus advantageously does not require the use of expensive detection elements such as intensifiers and CCDs, but instead uses conventional and relatively inexpensive photomultiplier tubes. Moreover, the processing of the signals from the photomultiplier tubes is elegantly simple and inexpensive to implement.

The detection and discrimination system 20 of the present invention facilitates a considerably greater count rate than heretofore realized. In addition, the system 20 has improved resolution.

Figure 5:
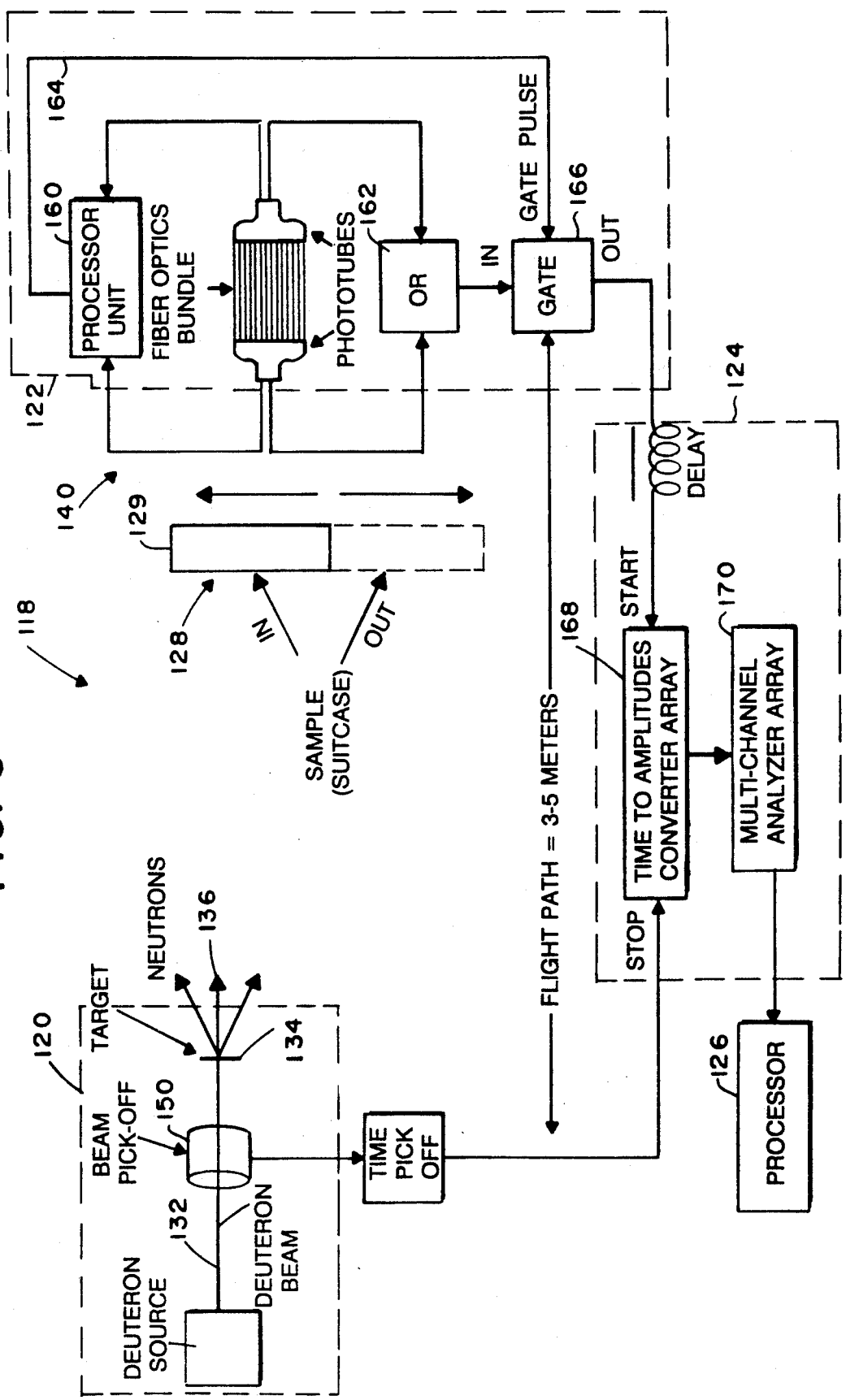
FIG. 5 is partially schematic side view of a contraband detection system including apparatus for detecting and discriminating between particles and rays according to the embodiment of FIG. 1.

FIG. 5 shows a contraband detection system 118 which employs the detection system 20 of the present invention. The contraband detection system 118 includes a neutron source 120: a neutron detector assembly 122; an absorption spectra analysis system 124: and, a classification processor 126. FIG. 5 also shows a conveying system 128 for introducing a sample object 129, such as a piece of luggage or a suitcase, between the neutron source 120 and the neutron detector assembly 122.

The neutron source 120 includes an accelerator for generating a pulsed 3.0 MeV deuteron beam 132 and for directing the pulsed deuteron beam to a target 134. The pulses of the deuteron beam 132 have a pulse length of about 1 nanosecond or less. The target 134 has a composition such that impingement of the pulsed deuteron beam 132 produces a pulsed white neutron beam 136.

The neutron detector assembly 122 is placed about three to five meters away from a deuteron detector 150 along the flight path of the neutrons 136. The neutron detector assembly 122 comprises a two-dimensional array 140 of neutron detector elements 142.

Each neutron detector element 142 in the array 140 is one of the detection systems 20 of the present invention. Each detection system 20 is oriented so that incoming neutrons are preferably incident along the axes of the light pipes 40 (e.g., in the direction of arrow 50 in FIG. 3).

As shown in FIG. 5, each photomultiplier is connected to apply a signal not only to a photomultiplier signal processor unit 160, but also to an OR gate 162. The photomultiplier signal processor unit 160 functions in the same manner as the unit 28 of the embodiment of FIG. 3. However, rather than apply an output signal to counters, the photomultiplier signal processor unit 160 of the embodiment of FIG. 5 applies a signal on line 164 to a gate 166 to control whether pulses from either of the photomultipliers as transmitted through OR gate 162 are to be applied to a corresponding time-to-amplitude converter provided in converter array 168. That is, when the multiplier signal processor unit 160 determines (in the manner aforedescribed with respect to the embodiment of FIG. 3) that a neutron in the energy range of interest is detected, the unit 160 permits a pulse from the photomultiplier which detected the neutron (the photon created by the neutron) to be gated through gate 166 to the corresponding converter in array 168.

Each time to amplitude converter in array 168 is connected to a corresponding multi-channel analyzer in an array 170. Each multichannel analyzer in array 170 is in turn connected to the processor 126.

The processor 126 of the contraband detection system 118 operates in the manner understood from my simultaneously-filed U.S. patent application Ser. No. 07/753,645 entitled "Contraband Detection Apparatus and Method", which is incorporated herein by reference.

While the invention has been particularly shown and described with reference to the preferred embodiments thereof, it will be understood by those skilled in the art that various alterations in form and detail may be made therein without departing from the spirit and scope of the invention. For example, the dimensions of the light pipes 40 may be chosen as a function of neutrons in another energy range of interest. Moreover, the photomultiplier signal processor unit 28 can be configured to count the number of pulses created by a particular particle or ray, and thereby provide an indication of the identity, or energy range, of the particle or ray.

The embodiments of the invention in which an exclusive property or privilege is claimed are defined as follows:

1. A scintillator for generating light pulses created by the ionization of particles travelling through the scintillator, the scintillator comprising a plurality of optical fibers arranged substantially contiguously along at least a first direction, the first direction being essentially perpendicular to a length dimension of the optical fibers, each of the optical fibers having a first end and an opposing second end, with each optical fiber having one of its ends being non-transmissive of light, contiguous ones of the optical fibers along the first direction not having their same ends being non-transmissive of light, each of the optical fibers having a cross sectional dimension thereof chosen in relation to a distance that a particular type of particle having a particular energy can travel.

2. The apparatus of claim 1, wherein the diameter of the optical fibers is chosen to be about 100 microns.

3. Apparatus for detecting a particular type of particle in an energy range of interest, the apparatus comprising:
   first photomultiplier means for producing a first signal when a light pulse is incident on the first photomultiplier means;
   second photomultiplier means for producing a second signal when a light pulse is incident on the first photomultiplier means;
   scintillator means for generating light pulses created by the ionization of particles travelling through the scintillator means, the scintillator means comprising a plurality of optical fibers arranged substantially contiguously along at least a first direction, the first direction being essentially perpendicular to a length dimension of the optical fibers, each of the optical fibers having a first end proximate the first photomultiplier means and an opposing second end proximate the second photomultiplier means, with each optical fibers having one of its ends being non-transmissive of light, contiguous ones of the optical fibers along the first direction not having their same ends being non-transmissive of light, each of the optical fibers having a cross sectional dimension thereof chosen in relation to a distance that the particular type of particle in the energy range of interest can travel;
   signal processing means for using the first signal from the first photomultiplier means and the second signal from the second photomultiplier means to provide an indication of when a particular type of particle in the energy range of interest is detected.

4. The apparatus of claim 3, wherein said energy range of interest is on the order of from about 0.5 MeV to about 3.0 MeV, and wherein the maximum diameter chosen for the optical fibers is on the order of about 100 microns.

5. The apparatus of claim 3, further comprising gating means responsive to the signal processing means for gating therethrough signals from the photomultiplier means.

6. The apparatus of claim 5, further comprising:
   means connected to particle creating means and to the gating means for determining a time of flight of a particle between the particle creating means and the scintillator means; and,
   analyzer means connected to the time of flight determining means for providing an energy spectrum indicative of a substance situated in a path between the particle creating means and the scintillator means.

7. The apparatus of claim 3, wherein an essentially checkerboard pattern of non-transmissive and transmissive ends of optical fibers are proximate each of the photomultiplier means.

8. A method for detecting a particle in an energy range of interest and for discriminating between the particle and background radiation, the method comprising the steps of:
   providing a scintillating medium between two photomultipliers, the scintillating medium being in the form of a plurality of optical fibers, the optical fibers being arranged substantially contiguously along at least a first direction, the first direction being essentially perpendicular to a length dimension of the optical fibers, each of the optical fibers having a first end proximate the first photomultiplier and an opposing second end proximate the second photomultiplier, with each optical fibers having one of its ends being non-transmissive of light, contiguous ones of the optical fibers along the first direction not having their same ends being non-transmissive of light, each of the optical fibers having a cross sectional dimension thereof chosen in relation to a distance that the particular type of particle in the energy range of interest can travel;
   using the photomultipliers to detect photons caused by ionization in the scintillating medium and to provide output signals upon the detection of photons;
   using said photomultiplier output signals to determine whether a photon is indicative of a particle in the energy range of interest.

9. A method for detecting a particle in an energy range of interest and for discriminating between the particle and background radiation, the method comprising the steps of:

(1) providing a scintillating medium between two photomultipliers, the scintillating medium being in the form of a plurality of optical fibers, the optical fibers being arranged substantially contiguously along at least a first direction, the first direction being essentially perpendicular to a length dimension of the optical fibers, each of the optical fibers having a first end proximate the first photomultiplier and an opposing second end proximate the second photomultiplier, with each optical fibers having one of its ends being non-transmissive of light, contiguous ones of the optical fibers along the first direction not having their same ends being non-transmissive of light, each of the optical fibers having a cross sectional dimension thereof chosen in relation to a distance that the particular type of particle in the energy range of interest can travel;

(2) determining the number of optical fibers in the scintillating medium in which photons are created by ionization during a predetermined time interval;

(3) using the determination of step (2) to determine whether a particle in the energy range of interest was detected in the scintillating medium.

10. A method for detecting a particle in an energy range of interest and for discriminating between the particle and background radiation, the method comprising the steps of:

providing a scintillating medium between two photomultipliers, the scintillating medium being in the form of a plurality of optical fibers, the optical fibers being arranged substantially contiguously along at least a first direction, the first direction being essentially perpendicular to a length dimension of the optical fibers, each of the optical fibers having a first end proximate the first photomultiplier and an opposing second end proximate the second photomultiplier, each of the optical fibers having a cross sectional dimension thereof chosen in relation to a distance that the particular type of particle in the energy range of interest can travel;

causing photons created by ionization in particular ones of the optical fibers of the scintillating medium to be incident upon only the first of the photomultipliers and photons created by ionization in particular others of the optical fibers to be incident upon only the second of the photomultipliers;

producing output signals from the first and second photomultipliers when photons are incident thereon;

using said photomultiplier output signals to determine whether a photon is indicative of a particle in the energy range of interest.

11. The method of claim 10, wherein the determination of whether a photon is indicative of a particle in the energy range of interest is based on the sequence and timing of output signals from the first and second photomultipliers.

* * * * *